April 10, 1945.  P. ROBINSON  2,373,601
ELECTRICAL CONDENSER
Filed July 3, 1943
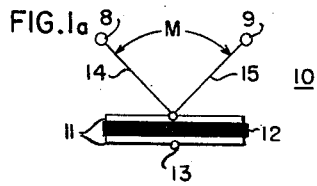
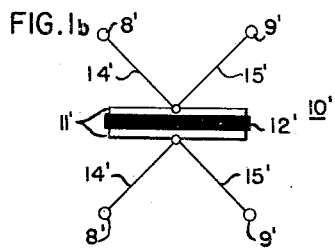
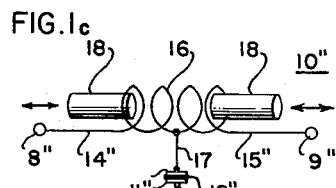
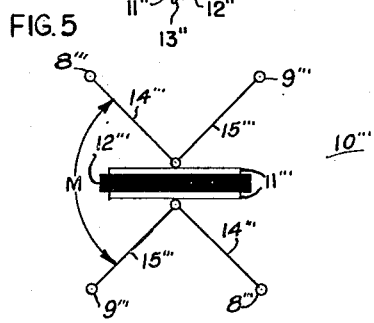
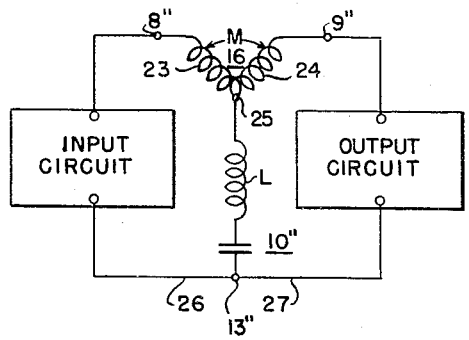
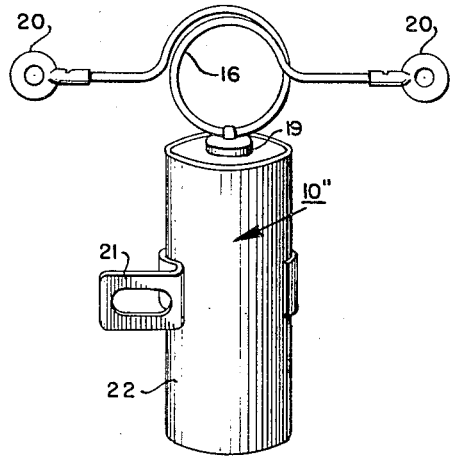
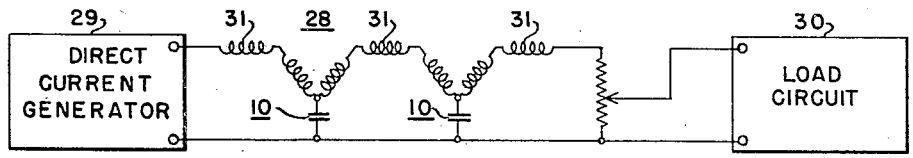
INVENTOR
PRESTON ROBINSON
BY Harry C. Page.
ATTORNEY Patented Apr. 10, 1945

2,373,601

UNITED STATES PATENT OFFICE 2,373,601

ELECTRICAL CONDENSER

Preston Robinson, Williamstown, Mass., assignor to Sprague Electric Company, North Adams, Mass., a corporation of Massachusetts Application July 3, 1943, Serial No. 493,389

8 Claims. (Cl. 250—16)

This invention relates to electrical condensers and more particularly to electrical condensers of a type in which all or a substantial portion of the inherent inductance therein is neutralized when the device is connected in circuit.

Electrical condensers generally possess at least a small amount of inherent inductance when connected in a circuit because of the fact that current flowing through such a condenser sets up a magnetic flux linkage. Most of this inductance occurs in the lead wires of the condenser, but a small amount results from the magnetic flux set up by the current in the condenser plates. While this inherent inductance is ordinarily quite small, the magnitude of its inductive reactance increases greatly and becomes particularly important at high frequencies. Such inherent inductance can be minimized by a careful arrangement of the lead wires and the connections to the condenser plates. However, it is often desirable and particularly advantageous in many applications to reduce this inherent inductance to a value which is materially lower than that which can be obtained alone by a careful design of the condenser components in accordance with prior art methods.

It is, therefore, an object of the invention to provide an improved electrical condenser of reduced inherent inductance which avoids the above-mentioned disadvantage present in prior art condensers.

It is another object of the invention to provide a condenser which, when connected in circuit, comprises a substantially pure capacitance.

It is a further object of the invention to provide an electrical condenser with a simple, inexpensive means for reducing the inherent inductance in the condenser elements.

It is still another object to provide an electrical condenser which can be adjusted to control the extent to which the inherent inductance of the condenser is reduced.

In accordance with the invention, an electrical condenser comprises a condenser structure having a pair of conductors between which there is undesired inductance and a plurality of leads for the condenser, each of which is connected to one of the conductors. One of these leads includes a terminal for connection in an input circuit for said condenser and another of the leads includes a terminal for connection in an output circuit for said condenser, said one lead and said other lead being positioned to have a substantial mutual inductance therebetween providing a coupling between said input and output circuits of opposite sense to that of the above-mentioned undesired inductance, thereby to neutralize a substantial portion of the undesired inductance.

For a better understanding of the present invention, together with other and further objects thereof, reference is had to the following description taken in connection with the accompanying drawing, and its scope will be pointed out in the appended claims.

In the accompanying drawing, Figs. 1a, 1b, and 1c illustrate diagrammatically three condensers constructed in accordance with the present invention; Fig. 2 is a schematic representation to aid in understanding the invention; Fig. 3 is a perspective view of a practical embodiment of the invention; Fig. 4 is a schematic circuit diagram of an application thereof; while Fig. 5 illustrates a further modification of the invention.

Referring now more particularly to Fig. 1a of the drawing, there is shown an electrical condenser comprising a condenser structure 10 having metallic condenser plates 11 which are separated in the usual manner by layers of dielectric material 12. Between the conductors 11, 11 there exists inherent inductance comprising the aggregate of the inherent inductance of the condenser plates and associated connections when the condenser structure 10 is connected in circuit. Two leads 14 and 15 are electrically connected to one of the conductors, in the specific condenser shown to the upper condenser plate 11 of the assembly. One of these leads and the other conductor, namely the lead 14 and the lower conductor 11, include terminals 8 and 13, respectively, for connection in an input circuit for the condenser while the other of the leads, namely lead 15, and the lower conductor 11 include terminals 9 and 13, respectively, for connection in an output circuit for the condenser. The leads 14 and 15 are positioned with respect to each other to have a substantial mutual inductance therebetween to provide a coupling between the leads of opposite sense to the above-mentioned undesired inherent inductance, thereby to neutralize a substantial portion of the undesired inductance of the condenser structure, as explained hereinafter.

It will be understood that in some condenser structures, other than the simple condenser illustrated, the lower terminal 13 may also comprise short leads to facilitate connecting the condenser in an electrical circuit. Fig. 1b illustrates such a similar condenser 10' comprising a pair of spaced plates 11', 11' and two pairs of displaced leads 14' and 15', a pair of which is electrically connected to each of the condenser plates 11', 11', Fig. 1c represents a modified condenser structure 10" in which the leads 14" and 15" comprise sections of a winding 16, which winding is connected at its mid-point by suitable means, such as a conductor 17, to the upper condenser plate 11". Since inductive coupling exists between sections of the winding 16 when the condenser structure is connected in circuit, the extent of this coupling can be varied by deforming the convolutions of the winding where semi-rigid leads are used, that is, by altering their pitch or the effective diameter thereof, or by inserting magnetic cores, such as powdered-iron slugs 18, within the outer turns of the winding. Axial adjustment of these slugs will alter the degree of inductive coupling between sections.

Fig. 2 is a schematic representation of the various parameters present in the condenser 10" constructed in accordance with the instant invention. The winding 16 is shown as a pair of symmetrical sections 23 and 24 which are provided with terminals 8" and 9" for connection to an input and an output circuit, respectively. These sections are wound in the same sense and have a small amount of self-inductance and a coupling exists therebetween as represented by the mutual inductance M. An inductance designated as L is represented as being connected between the junction point 25 of the sections 23 and 24 and the condenser 10". Inductor L represents the lumped inherent inductance of the condenser 10". The bottom plate of the condenser is electrically connected to branches 26 and 27 of an input and an output circuit, respectively.

Referring now to Fig. 2 for the purpose of considering the operation of the instant invention, it will be apparent than an inductive coupling exists between the sections 23 and 24 of winding 16, when connected in circuit as illustrated. The mutual-inductance component M constitutes in the condenser structure 10" a negative inductance effectively in series with the inductor L and which opposes the positive inherent self-inductance L of the condenser. The negative inductance may be so proportioned that it substantially reduces or cancels the inherent inductance L, thereby providing a condenser 10" having a substantially pure capacitance. It will be apparent that over-compensation may be provided for the inherent self-inductance L by the arrangement of the invention.

The connecting leads for the condenser shown in Figs. 1a and 1b are illustrated as straight wires 14, 15 and 14', 15', respectively. The inductive coupling between these leads is appreciable at high frequencies and, hence, the effective coupling between these leads, which simulates a negative inductance in series with the condenser, is sufficient in some applications to neutralize the inherent inductance in the condenser structure. Where the lead wires comprise a winding, as in Fig. 1c, the developed negative inductance is considerably greater and adjustment of the value thereof is relatively more simple. A permanent adjustment may be made to provide a desired result at a single frequency or an adjustment may be made for favorable performance over a particular range of frequencies. Alternatively, individual adjustment for each of several selected frequencies is possible, particularly where a tuning means, similar to that shown diagrammatically in Fig. 1c, is employed.

In the Fig. 3 embodiment, a potted condenser 10" is provided with a winding comprising a single semi-rigid metal loop 16 which is secured at its mid-point in a suitable manner, as by soldering, to a central projecting terminal 19 while connectors 20 are fastened to the ends of this loop to provide terminals corresponding to 8" and 9" of Fig. 1c. A suitable bracket 21 is secured to the metal container 22 and forms the other terminal for the condenser corresponding to terminal 13" of Fig. 1c. It will be evident that the winding 16 of Fig. 3 may include a plurality of convolutions, when necessary, instead of the single loop, as illustrated.

Fig. 4 is a schematic circuit diagram of one application of condensers constructed in accordance with the instant invention. The condensers are shown connected as shunt elements of a low-pass filter 28, which filter is connected between a source, such as a direct current generator or rectifier 29 the output signal of which includes an alternating current or ripple component, and a load circuit 30. Inductors 31 are included in the series arms of the filter.

When condensers constructed in accordance with the instant invention are employed as shunt elements in a low-pass filter as shown in Fig. 4, the filter is suitable for smoothing out the pulsating output component of a direct current generator 29, such as a commutator generator or a vibrator or thermionic rectifier. As so used, frequency components of the generator 29 above the cutoff frequency of the filter 28 are not passed to the load circuit 30. In such a low-pass filter the series arms should comprise only pure inductance and the shunt arms should comprise only pure capacitance. The condenser of the present invention is, therefore, particularly useful in meeting this requirement for the shunt arms of such a filter.

While there has been described an arrangement as in Fig. 1b, in which each lead of a plurality of leads, as 14', 15' and 14', 15', is connected to one of the conductors 11', 11', and in which the inductive coupling between the input lead 14' and output lead 15' connected to a common conductor 11' is employed for the purpose of neutralizing the inherent inductance in the condenser structure, it is obvious that inductive coupling between either of the input leads, as upper lead 14', and either of the output leads, as lower lead 15', may be employed for this purpose, the selected input lead and the selected output lead being positioned to have a substantial mutual inductance therebetween. In Fig. 5 there is illustrated a condenser 10'" having leads arranged to provide inductive coupling in this manner. An input lead 14'" which is connected to upper conductor 11'" is positioned so that a substantial mutual inductance M exists between it and an output lead 15'" which is connected to lower conductor 11'" of the condenser structure.

While there has been described an arrangement, as in Figs. 1a, 1b, 1c and 5, in which each lead, as leads 14 and 15 in Fig. 1a, includes its terminal as an additional element, as terminals 8 and 9, respectively, it is obvious that the end of each such lead constitutes, and may be considered as, a terminal in which case it may be connected in the circuit in any conventional manner, as by soldering.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An electrical condenser comprising, a condenser structure having a pair of conductors between which there is undesired inductance, a plurality of leads for said condenser each of which is connected to one of said conductors, one of said leads including a terminal for connection in an input circuit for said condenser and another of said leads including a terminal for connection in an output circuit for said condenser, said one lead and said other lead being positioned to have a substantial mutual inductance therebetween providing a coupling between said input and output circuits of opposite sense to that of said undesired inductance, thereby to neutralize a substantial portion of said undesired inductance.

2. An electrical condenser comprising, a condenser structure having a pair of conductors between which there is undesired inductance, a plurality of leads for said condenser each of which is connected to one of said conductors, one of said leads including a terminal for connection in an input circuit for said condenser and another of said leads including a terminal for connection in an output circuit for said condenser, said one lead and said other lead being positioned in an angular relationship to have a substantial mutual inductance therebetween providing a coupling between said input and output circuits of opposite sense to that of said undesired inductance, thereby to neutralize a substantial portion of said undesired inductance.

3. An electrical condenser comprising, a condenser structure having a pair of conductors between which there is undesired inductance, a plurality of leads for said condenser each of which is connected to one of said conductors, one of said leads including a terminal for connection in an input circuit for said condenser and the other of said leads including a terminal for connection in an output circuit for said condenser, said one lead and said other lead being positioned to have a substantial mutual inductance therebetween providing a coupling between said input and output circuits of opposite sense to that of said undesired inductance, thereby to neutralize a substantial portion of said undesired inductance, and means cooperating with said leads for adjusting the value of said mutual inductance.

4. An electrical condenser comprising, a condenser structure having a pair of conductors between which there is undesired inductance, two leads electrically connected to one of said conductors, one of said leads and the other of said conductors including terminals for connection in an input circuit for said condenser and the other of said leads and said other conductor including terminals for connection in an output circuit for said condenser, said leads being positioned to have a substantial mutual inductance therebetween providing a coupling between said input and output circuits of opposite sense to that of said undesired inductance, thereby to neutralize a substantial portion of said undesired inductance.

5. An electrical condenser comprising, a condenser structure having a pair of conductors between which there is undesired inductance, two leads electrically connected to one of said conductors, one of said leads and the other of said conductors including terminals for connection in an input circuit for said condenser and the other of said leads and said other conductor including terminals for connection in an output circuit for said condenser, said leads comprising a winding consisting of mutually inductively coupled portions individual thereto providing a coupling between said input and output circuits of opposite sense to that of said undesired inductance, thereby to neutralize a substantial portion of said undesired inductance.

6. An electrical condenser comprising, a condenser structure having a pair of conductors between which there is undesired inductance, two leads comprising a winding electrically connected at the mid-point thereof to one of said conductors, one of said leads and the other of said conductors including terminals for connection in an input circuit for said condenser and the other of said leads and said other conductor including terminals for connection in an output circuit for said condenser, said leads being positioned to have a substantial coupling inductance therebetween providing a coupling between said input and output circuits of opposite sense to that of said undesired inductance, thereby to neutralize a substantial portion of said undesired inductance.

7. An electrical condenser comprising, a condenser structure having a pair of conductors between which there is undesired inductance, two semi-rigid leads each of which comprises a symmetrical portion of a winding and is electrically connected to one of said conductors, one of said leads and the other of said conductors including terminals for connection in an input circuit for said condenser and the other of said leads and said other conductor including terminals for connection in an output circuit for said condenser, said leads being positioned to have a substantial mutual inductance therebetween providing a coupling between said input and output circuits of opposite sense to that of said undesired inductance, thereby to neutralize a substantial portion of said undesired inductance.

8. An electrical condenser comprising a condenser structure having a pair of conductors between which there is undesired inductance, two leads each of which comprises a half-section of a winding and is electrically connected to one of said conductors, one of said leads and the other of said conductors including terminals for connection in an input circuit for said condenser and the other of said leads and said other conductor including terminals for connection in an output circuit for said condenser, said leads being positioned to have a substantial coupling inductance therebetween providing a coupling between said input and output circuits of opposite sense to that of said undesired inductance, thereby to neutralize a substantial portion of said undesired inductance, and axially adjustable inductance-adjusting means for adjusting the inductance of each of said half-sections of said winding to adjust the value of said inductive coupling.

PRESTON ROBINSON.